3,003,861
SOLID COMPOSITE PROPELLANTS CONTAINING INORGANIC OXIDIZING AND POLYMERIC QUATERNARY AMMONIUM COMPOUNDS
William B. Reynolds and James E. Pritchard, Bartlesville, Okla., assignors to Phillips Petroleum Company, a corporation of Delaware
No Drawing. Filed Apr. 25, 1952, Ser. No. 284,447
26 Claims. (Cl. 52—.5)

This invention relates to solid rocket propellants which are particularly useful in jet propulsion motors, also known as rocket motors. In one of its more specific aspects this invention relates to solid rocket propellants comprising an oxidant and a polymeric material. In still another of its more specific aspects this invention relates to rocket propellants comprising an oxidant and a polymeric material. In still another of its more specific aspects this invention relates to rocket propellants comprising an oxidant and a polymeric quaternary ammonium compound and to a method for their preparation.

Rocket propellants have achieved considerable military importance as well as commercial importance. Jet propulsion motors of the type in which the solid rocket propellants of this invention may be employed, may be used to assist take-off for a heavily loaded plane. Usually the entire motor is dropped as soon as the charge is burned. Jet propulsion motors of the type which employ the solid rocket propellants of this invention may also be used in other situations as an auxiliary to the conventional power plant where an extra surge of power is required or to propel projectiles. In one of the most convenient types of such motors, the fuel is located in the combustion chamber itself and is burned with the aid of an oxidizer which is also situated in the combustion chamber admixed with the fuel, thus avoiding the need for complicated feeding arrangements.

It is an object of this invention to provide new solid rocket propellants. It is a more specific object of this invention to provide rocket propellants comprising an oxidant and a polymeric quaternary ammonium compound. It is still a more specific object of this invention to provide a solid rocket propellant comprising a solid oxidant and a solid polymeric material and to provide a method for the manufacture of such solid propellants. These and other objects of the invention will become apparent and suggest themselves from the accompanying disclosure.

It has now been discovered that solid rocket propellants can be prepared which comprise an oxidant and a polymeric organic compound. More specifically it has now been discovered that solid polymeric compositions comprising a solid oxidant and a solid polymeric material as a binder and fuel therefor, obtained by reacting a copolymer of a conjugated diene and a heterocyclic nitrogen base with a quaternizing agent which forms a solid compound therewith, are useful as rocket propellants. Still more specifically it has now been discovered that solid rocket propellant compositions can be readily produced by reacting an admixture comprising a solid oxidant, a copolymer of a conjugated diene with a copolymerizable, preferably vinyl-substituted, heterocyclic nitrogen base of the pyridine and quinoline series and a quaternizing agent therefor. The admixture prior to reaction (heating), if the copolymer is liquid, has the consistency of a stiff paste which after reaction (quaternization) sets to a hard, resilient material which is resistant to shock even at low temperatures. Heating effects a reaction between the copolymer and the quaternizing agent to produce a solid product, such as the corresponding quaternary ammonium polymeric material.

According to our invention solid rocket propellant compositions are prepared by heating an admixture comprising a solid oxidant, a copolymer of a conjugated diene with a copolymerizable heterocyclic nitrogen base, preferably of the pyridine and quinoline series, and a quaternizing agent which forms a solid compound with said copolymer. The quaternizing agent is usually employed in an amount sufficient to substantially completely convert all of the liquid copolymer to the corresponding solid compound. For example the quaternizing agent should substantially completely convert the heterocyclic nitrogen unit of the copolymer to the corresponding quaternary ammonium unit. If desired more or less than the stoichiometric amount of quaternizing agent may be employed depending upon the physical properties desired in the solid polymeric material. For example only about 10 to 50 percent of the required stoichiometric amount may be used or 10 percent stoichiometric excess over the amount theoretically required may be employed.

Suitable quaternizing agents useful in the practice of this invention are numerous and include the various alkyl halides such as methyl iodide, methyl bromide, ethyl iodide, propyl iodide, hexyl iodide, nonyl bromide and cetyl bromide; the various alkylene halides such as methylene iodide, ethylene bromide, propylene dichloride, butene dibromide and octene dibromide; the various substituted alkanes, necessarily including the above alkyl and alkylene halides, which contain at least one hydrogen atom attached to a carbon atom such as bromoform, chloroform, 1,2-dichloropropane, 1,2-dibromobutane, ethylene chlorohydrin, iodoform, acetyl chloride, chloroacetyl chloride; alkyl sulfates such as methyl sulfate, ethyl sulfate; and the various substituted aromatic compounds such as picryl chloride, benzoyl chloride, benzene sulfonyl chloride, benzyl chloride, benzal chloride, benzotrichloride, methylbenzene sulfonate. Other quaternizing agents which may be employed in the practice of this invention include the polyhalogenated cycloalkenes such as hexachlorocyclopentadiene. The foregoing enumeration is not intended to include all the possible, suitable quaternizing agents but is only representative since many others may be used. If an organic compound contains an active halogen atom attached to a carbon atom or contains a similar active quaternizing group, and if the compound is not an acid it is useful in our invention. In general active quaternizing agents such as organic halides, organic sulfates and organic acid chlorides and the like which contain not more than 20 carbon atoms per molecule and contain at least one halogen or equivalent quaternizing group, for example, an alkylaryl sulfonate, an alkyl sulfate or the like, are suitable in the practice of this invention (these compounds may be characterized as containing active halogen or equivalent quaternizing group). Those compounds which contain the configuration

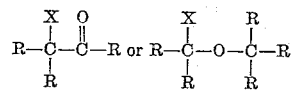

wherein X is a hologen atom such as chlorine, bromine and iodine and the R's represent oxygen, hydrogen or carbon valence linkages to their respective carbon atoms, are especially useful.

In effecting the quaternization reaction to produce these solid, polymeric materials it is pointed out that the nitrogen atoms of the heterocyclic base nuclei in the resulting solid material each have their five so-called valence bonds attached to atoms (or radicals) other than a hydrogen atom, e.g. four nitrogen to carbon bonds and one nitrogen to sulfur or halogen bond, or three nitrogen to carbon bonds, one nitrogen to sulfur bond and one nitrogen to halogen bond. In other words the available valencies of the nitrogen atoms contained in the copolymerized heterocyclic base nuclei of the copolymer are satisfied by atoms (or radicals) other than a hydrogen atom. The reaction of a conjugated diene-heterocyclic base copolymer with a quaternizing agent yields a product which contains these characteristic nitrogen valencies in the recurring nitrogen base units of the polymer. In distinction, if the pyridine nucleus (unit) of the copolymer were reacted with an acid acting substance (mineral acid, organic acid or the like) one of the two available nitrogen valencies would be satisfied by a nitrogen to hydrogen bond and accordingly would not be a quaternary compound of the type contemplated. The quaternary salts tend to be less water soluble whereas pyridinium salts formed by reaction with an acid acting compound (whereby a hydrogen atom is attached to a nitrogen atom) tend to be more water soluble. Furthermore, the quaternizing reaction of this invention is readily controlled since it proceeds rather slowly. Quaternary salts are distinguished over the other pyridinium or quinolinium salts in that they are derived from strong bases. Also pyridinium or quinolinium salts (other than a quaternary salt) form free pyridine or quinoline, water and salt when reacted with a strong base. Therefore, suitable quaternizing agents are those compounds which when reacted with the nitrogen atom of the heterocyclic base do not attach or link a hydrogen atom thereto. Expressed differently, the quaternizing agents of this invention are those compounds X, Y which react with the nitrogen atom of the heterocyclic base nucleus of the copolymer or with a compound such as pyridine or quinoline to yield a material which may be characterized by the formulas

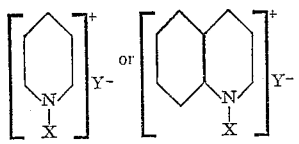

wherein X may be any molecular fragment, such as an organic radical, other than hydrogen and Y is the remaining molecular fragment such as an atom or radical (anion).

Of the alkyl halides, the alkyl bromides and alkyl iodides having from 1 to 20 carbon atoms are preferred in the practice of this invention as quaternizing agents. Also of the alkylene halides, the alkylene bromides and alkylene iodides having from 1 to 20 carbon atoms are preferred in the practice of this invention. Similarly of the substituted alkanes which include the above-referred alkyl and alkylene halides, those which contain at least one hydrogen atom attached to a carbon atom and which contain from 1 to 20 carbon atoms and at least one substituent halogen group are preferred in the practice of this invention. The substituted alkanes may contain as a substituent therein a sulfate group or groups. Of the substituted aromatic compounds which may be employed as quaternizing agents, the halogen, sulfonate or nitro substituted benzene compounds are preferred, especially the aralkyl halides, alkaryl halides and the aryl halides containing not more than 20 carbon atoms. The various quaternizing agents or mixtures thereof which may be employed in the practice of this invention are further disclosed in the co-pending patent application of J. E. Pritchard Serial No. 284,448, filed April 25, 1952, now abandoned, the disclosures of which are hereby incorporated into and made a part of this application.

The temperatures at which the quaternizing agent is reacted to effect the solid polymer formation are usually in the range between 0° and 175° C., although higher or lower temperatures may be used if desired. The time required to substantially completely effect the reaction is dependent upon the temperature employed and usually varies from about a few minutes, 5 to 10 minutes, to about 10 hours or more, even in some cases as high as 80 hours.

The copolymers from which solid polymers are prepared to produce solid rocket propellants in accordance with our invention can be produced by any suitable method, e.g., emulsion polymerization. These copolymers if liquid can vary from very fluid to very viscous material and can have a viscosity measurement in SUS at 100° F. from below about 1000 up to about 10,000 or higher, such as 400,000. If solids, these copolymers may vary from soft to rather hard rubbers, preferably having an ML-4 Mooney value in the range 10 to 100 and higher. The average molecular weight of these copolymers can range from about 1000 to about 150,000 although higher or lower molecular weight copolymers can be used in the practice of our invention. Copolymers having an average molecular weight in the range from about 2,000 to about 50,000 are especially useful. Many polymerization recipes can be used for preparing the copolymers employed in the practice of this invention. It is pointed out that the resulting solid polymer material acts not only as a binder but also as the fuel for the solid oxidant blended therewith in the solid rocket compositions of our invention.

The conjugated dienes employed in the practice of this invention are preferably conjugated diolefins which contain four to six inclusive carbon atoms per molecule, and include 1,3-butadiene, isoprene, piperylene, methylpentadiene, 2,3-dimethyl-1,3-butadiene, chloroprene and others. However conjugated dienes having more than 6, such as 8, carbon atoms per molecule may also be used. Furthermore various alkoxy, such as methoxy and ethoxy, and cyano derivatives of these conjugated dienes can also be used in the process of our invention.

The heterocyclic nitrogen bases, including the alkyl substituted bases, which are employed in the practice of our invention are those which are copolymerizable with a conjugated diene and include the

substituted nitrogen bases wherein R is a suitable substituent atom or group, e.g. a hydrogen atom or a hydrocarbyl group, such as an alkyl group. The vinyl-substituted heterocyclic nitrogen bases of the pyridine and quinoline series having only one vinyl substituent group and their various alkyl-substituted derivatives thereof are preferred. It is preferred however that the total number of carbon atoms in the nuclear substituted alkyl groups attached to any pyridine or quinoline unit be not greater than twelve. Furthermore in addition to vinyl-substituted pyridines and vinyl-substituted quinolines, the isopropenyl-substituted (i.e. a vinyl group having a methyl substituent in the alpha position) pyridines or quinolines may also be used. It is to be understood that mixtures of various conjugated dienes and mixtures of various copolymerizable heterocyclic bases may be employed in the practice of our invention together with, if desired up to about 50% by wt. preferably between 5 and 30% by wt. of the total monomeric material, of other copolymerizable materials, such as acrylonitrile.

For the production of the copolymers employed in the practice of our invention the amount of a conjugated diolefin employed is generally in the range of from 25 to 98 parts per 100 parts of the total monomeric material and the amount of copolymerizable heterocyclic base employed is in the range from 75 to 2 parts per 100 parts of the total monomeric material, the proportions of the monomeric material employed depending upon the type of copolymer desired.

The solid polymers formed by the interaction of the copolymers with the various quaternizing agents range from soft, rubber-like products to rubbers and hard resinous materials. Properties can be varied depending upon the kind of monomeric material, quantities employed, type (liquid or solid) of copolymer used, type of quaternizing agent employed and the time and temperature of reaction of the copolymer with the quaternizing agents. In general as the amount of the copolymerizable heterocyclic base is increased the final solid polymer after quaternization, such as with a methyl halide, becomes increasingly resinous in character. The solid polymer products which contain a larger quantity of a conjugated diene are more rubber-like in nature. The solid polymer products obtained from liquid copolymers are frequently tough, slightly elastic materials having small extensibility and could be referred to as "short rubbers." The solid polymer products obtained from solid copolymers are rubbers and exhibit excellent tensile strength and extensibility.

Oxidants applicable in the practice of our invention are those oxygen-containing solids which are employed as oxidizing agents and/or which readily give up oxygen and include ammonium nitrate and ammonium and alkali metal compounds, such as potassium and sodium perchlorates, chlorates, chlorites, and hypochlorites. Dichromates, chromates, chromites, and persulfates may also be employed. The oxidants which are compounded in the preparation of the solid rocket propellants of this invention are preferably ammonium nitrate and the potassium, ammonium, and sodium perchlorates. Although the ammonium, potassium, and sodium salts are preferred, salts of other materials such as lithium, especially the alkaline earth metals such as calcium, strontium, barium, and magnesium, as well as aluminum, boron and the like may also be employed. In the preparation of the solid rocket propellants of this invention the oxidants are powdered to sizes preferably finer than about 200 mesh. The powdered oxidants and the copolymer together with a suitable quaternizing agent are admixed together to form a paste or homogeneous solid mass. The amount of solid oxidant employed in the admixture is usually a major amount of the total admixture, generally in the range from about 50 to about 90 percent by weight of the total admixture. If desired a minor amount of oxidant, less than 50 percent by weight can be employed.

As indicated hereinbefore the quaternizing agent may be employed in an amount below or above that theoretically required to react with the copolymer. The resulting admixture is then heated usually after suitable forming or pelleting, preferably in a suitable mold, to a temperature generally from 0°–175° C. and at a suitable pressure, such as in the range from about atmospheric to about 2000 p.s.i.g. to prevent the escape of the usually more volatile quaternizing agent. Usually the heating period is relatively short, and is determined by the oxidant employed, the polymer composition, the quaternizing agent employed, the oxidant-copolymer ratio and other factors. In addition to the above-mentioned ingredients various auxiliary materials may be employed in the solid propellant composition of this invention, these include the various so called oxidation catalysts such as the chlorides and naphthenates of cobalt, zinc, iron, and similar heavy metals. As indicated hereinabove the pressure employed is determined by the temperature and the quaternizing agent used. If the reaction is carried out at room temperature or below, atmospheric pressure is frequently employed, however, when the admixture is heated to an elevated temperature, it is preferred to operate at higher pressures sufficient to prevent volatilization of the quaternizing agent and/or copolymer. The forming or pelleting pressure employed prior to the reaction or even accompanying the reaction may be any sufficient and suitable pressure.

The invention and the advantages to be obtained thereby are further set forth and illustrated in the following examples.

EXAMPLE I

A liquid copolymer of 1,3-butadiene with 2-vinylpyridine was prepared by emulsion polymerization at 50° C. using the following recipe:

| | Parts by weight |
|---|---|
| 1,3-butadiene | 75 |
| 2-vinylpyridine | 25 |
| Sodium soap flakes | 5 |
| Water | 180 |
| Potassium persulfate | 0.3 |
| Mercaptan blend [1] | 5 |

[1] A blend of tertiary $C_{12}$, $C_{14}$, and $C_{16}$ aliphatic mercaptans in a ratio of 3:1:1 parts by weight.

Polymerization was effected in the conventional manner and gave a 95 percent conversion in eight hours.

A mixture of 2 grams ammonium nitrate, 0.5 gram liquid butadiene/2-vinylpyridine copolymer, and sufficient (0.17 grams) methyl iodide to react with the copolymer was heated in a mold for 15 minutes at 125° C. and at a pressure of 500 p.s.i.g. A gray-green pellet which burned slowly was obtained.

EXAMPLE II

A liquid 75/25 butadiene/2-methyl-5-vinylpyridine copolymer was prepared at 50° C. using the recipe of Example I. A number of pellets were prepared using the following proportions of ammonium nitrate, liquid copolymer, and methyl halide:

| $NH_4NO_3$, parts by weight | Copolymer, parts by weight | $CH_3Br$, parts by weight | $C_3I$, parts by weight |
|---|---|---|---|
| 80 | 20 | 3.99 | |
| 80 | 20 | | 5.96 |
| 85 | 15 | | 4.47 |
| 90 | 10 | | 2.98 |

In each case the amount of methyl halide employed was that stoichiometrically equivalent to the 2-methyl-5-vinylpyridine present in the copolymer. The ingredients were mixed at room temperature and in each case the mixture had the consistency of a stiff paste. After mixing each sample was placed in a mold at a pressure of 1000 p.s.i.g. and extruded immediaely. The uncured pellets were allowed to stand in a desiccator at room temperature (about 25° C.). After a 2 hour period, all the pellets prepared with methyl iodide were hard. The methyl bromide pellet became hard after two days and the hardness increased after standing a week. All the pellets when hard withstood fracture or cracking when heated to 150° C. and when cooled to −120° F.

A pellet was prepared from 80 parts $NH_4NO_3$ and 20 parts of the above-described copolymer, omitting the methyl halide. Otherwise the procedure was as described above. The pellet crumbled easily and did not have enough cohesion so it could be removed from the mold satisfactorily.

When preparing pellets or grains suitable for use as rocket propellants, the pasty mixture of solid oxidant, liquid copolymer, and quaternizing agent is placed in a mold under a pressure in the range from 100 to 2000 p.s.i.g. It is extruded from the mold and the uncured pellets (the quaternizing agent being substantially unreacted with the liquid copolymer) obtained are cured (reacted) under the desired conditions of temperature and pressure such as discussed above, i.e., at a curing (reaction) temperature in the range from 0°–200° C. and a pressure in the range from atmospheric to 2000 p.s.i.g. The curing time is in the range from 5 minutes to six weeks depending upon the temperature and also the polymer and quaternizing agent used. In general, pellets prepared from butadiene/2-vinylpyridine copolymers require a longer curing time than those prepared from butadiene/2-methyl-5-vinylpyridine copolymers. Likewise pellets prepared from methyl bromide generally require a longer curing time than those prepared from methyl iodide. A hard pellet prepared using methyl iodide and butadiene/2-methyl-5-vinylpyridine can be obtained by curing at 25° C. for a period from one to 24 hours while a similar pellet prepared using methyl bromide under the same conditions requires a curing time of about a week. However a methyl bromide pellet cured at an elevated temperature yields a hard pellet in about 5 to 60 minutes.

EXAMPLE III

*Preparation and evaluation of model rocket grains*

Rocket grains were prepared which contained inorganic salts and binders in the ratio of 80/20. All salts were pulverized, sifted through a 200 mesh screen, and dried in vacuum ovens or desiccators as required. Liquid polymers and quaternizing agents were mixed in desired proportion (usually chemical equivalents) before incorporation of the salt. This raw mix was a viscous fluid when a 80/20 salt/binder ratio was used but resembeld a heavy dough or paste at higher ratios. The salt-binder mixture was pressed for five minutes at 1000 pounds per square inch pressure to yield a "green" uncured seven-gram pellet three-eighths inch thick and one inch in diameter. Curing of the green pellets was accomplished by heating them in air for various periods of time at 80° C.

The structural strength of cured grains was determined by subjecting them to crushing tests in a hydraulic press. In these tests the grains were pressed for one minute at each of two (2) different pressures, up to about 1000 p.s.i., and either 2000 p.s.i. or until failure occurred. The percentage deformation or compression was measured after each pressure period and the condition of the pellet noted.

In addition to deformation tests, selected rocket grains were subjected to thermal cycling from a temperature of 176° F. to dry ice temperature of −100° F. and back to room temperature. In all cases the rocket grains appeared to withstand thermal cycling without cracking, loss of shape, or physical strength.

The results of these tests are set forth in Table No. 1.

TABLE 1

DEFORMATION TESTS ON 80/20 AMMONIUM NITRATE/BINDER GRAINS
[Binder: 72/25 Butadiene/2-methyl-5-vinylpyridine]

| Quaternizing agent | Percent deformation | | Condition of pellet at 2,000 p.s.i. |
| --- | --- | --- | --- |
| | Total at 1,000 p.s.i. | From 1,000 to 2,000 p.s.i. | |
| None [1] | 2.25 | 26.4 | Flattened; soft, crumbled. |
| None [2] | 5.60 | 41.2 | Entirely flattened and crumbled. |
| Methyl bromide [1] | 3.33 | 19.6 | Flattened; sides slightly bowed, still hard and coherent. |
| Methyl iodide [1] | 2.22 | 17.1 | Flattened; hard, but brittle; slight amount of crumbling. |
| Benzotrichloride [1] | 1.19 | 14.5 | Flattened; hard, moderately brittle; no crumbling. |
| Chloropicrin [1] | 1.15 | 23.2 | Hard, fairly brittle; slight amount of crumbling. |

[1] 0.5 hour cure.
[2] 1.0 hour cure.

EXAMPLE IV

A number of "green" pellets were extruded at a high pressure without curing and curing was then effected at atmospheric pressure.

It was found that 80/20 ammonium nitrate/binder mixtures when pressed at 1000 pounds for five minutes could be extruded as well-shaped cohesive pellets. On curing at 80° C. for 48 hours very obvious advantages for quaternized binders over unquaternized polymers were disclosed. Crushing test data revealed that a curing time of 48 hours was generally better than shorter periods. However, grains cured only 24 hours were definitely superior to the control.

The test results are set forth in Table No. 2.

TABLE 2

DEFORMATION TESTS ON 80/20 AMMONIUM NITRATE/BINDER GRAINS
[Binder: 75/25 butadiene/2-methyl-5-vinylpyridine]

| Quaternizing agent | Percent deformation | | Condition of pellet at 2,000 p.s.i. |
| --- | --- | --- | --- |
| | Total at 1,000 p.s.i. | From 1,000 to 2,000 p.s.i. | |
| None [2] | 25.4 | | Edges collapsed and pellet largely crumbled at 1,000 p.s.i. |
| Methyl bromide [1] | 6.25 | 17.8 | Flattened; fairly brittle; edges crumbled. |
| Methyl iodide [1] | 4.20 | 19.0 | Flattened; fairly brittle; crumbled at edges. |
| Benzotrichloride [1] | 5.00 | 5.3 | Unchanged; slight crack on edge. |
| Chloropicrin [1] | 2.00 | 6.30 | Do. |

[1] Cured 48 hours.
[2] Control, heated for 48 hours.

EXAMPLE V

Deformation tests on grains prepared as set forth in Example IV and with various quaternizing agents were performed. All of these grains withstood the 500 pound and 1000 pound pressure periods. Grains containing benzotrichloride and hexachlorocyclopentadiene as the quaternizing agent are of particular interest because they withstood an additional 2000 pound test with total deformations of only 11 to 28 percent.

The test results are set forth in Table 3.

TABLE 3

DEFORMATION TESTS ON 80/20 AMMONIUM NITRATE/BINDER GRAINS
[Binder: 75/25 butadiene/2-methyl-5-vinylpyridine]

| Quaternizing agent | Percent deformation | | Condition of pellet at 2,000 p.s.i. |
| --- | --- | --- | --- |
| | Total at 1,000 p.s.i. | From 1,000 to 2,000 p.s.i. | |
| None | | | Completely collapsed at 1,000 p.s.i. |
| Methyl iodide [1] | 7.90 | 20.4 | Flattened; hard; sides slightly bowed. |
| Benzotrichloride | 8.03 | 6.80 | Unchanged. |
| Chloropicrin | 6.31 | 24.7 | Flattened; moderately crumbled. |
| Benzoyl chloride | 10.8 | 17.6 | Unchanged. |
| Hexachlorocyclopentadiene | 5.98 | 5.45 | Do. |

[1] Pellets were sealed in containers during curing.

Small segments of various ammonium nitrate grains were ignited at room temperature to observe combustion characteristics. In general, all types of compositions, irrespective of quaternizing agent used, burned at low uniform rates, and flame fronts progressed regularly throughout the entire grain.

Compositions were also prepared from liquid copolymers of butadiene with either 2-vinylpyridine or 2-methyl-5-vinylpyridine having a monomer wt. ratio of 50/50 and 90/10 as well as 75/25. Compositions having an oxidant/binder ratio of 80/20 were made therefrom with ammonium nitrate as the oxidant. Stronger grains were obtained when polymeric binders of a higher vinylpyridine content were used. This is illustrated by comparison of crushing data on grains containing 75/25 and 50/50 butadiene/2-methyl-5-vinylpyridine copolymer as a binder. These polymers were of heavy lube oil consistency and were quaternized with hexachlorocyclopentadiene during the curing of the grain at 80° C. for 48 hours. In crushing tests the grains withstood pressure periods of 500, 1000, and 2000 pounds. The grains having the 75/25 ratio exhibited 5.3 percent deformation at 1000 pounds and 7.5 percent at 2000 pounds while the grains having the 50/50 ratio were deformed to the extent of 2.2 percent at 1000 pounds and 3.4 at 2000 pounds.

As an added feature of this invention it has been found that the physical properties, particularly structural strength, of the compositions prepared in accordance with this invention can be improved by incorporating a vulcanizing agent therewith, i.e. present when the admixtures containing solid oxidant-copolymer-quaternizing agent are cured (reacted). A typical vulcanizing agent would include a mixture of a vulcanization accelerator such as Santocure (a condensation product of mercaptobenzothiazole and cyclohexylamine) sulfur and zinc oxide in the proportions by weight 1.5:5:5. This mixture may be added to about 100 parts by weight of the copolymer. The resulting admixture together with a suitable quaternizing agent for forming the solid polymers constitutes the binder.

Model rocket grains were prepared employing potassium chloride as a simulated solid oxidant. Potassium chloride is a non-hygroscopic salt exhibiting little tendency to form coherent cakes under pressure in the absence of binders, consequently, the structural strength of grains containing this salt is dependent almost entirely upon the properties of the binding material.

Deformation tests on these simulated rocket grains prepared with vulcanized binders revealed that significant improvements were realized by combining vulcanization and quaternization reactions in the curing process. Grains prepared with vulcanizing agents in the absence of a quaternization agent were quite rubbery but not very strong. When vulcanization was combined with quaternization, very strong grains were obtained. For example, methyl sulfate in the absence of vulcanizing agents yielded a potassium chloride pellet exhibiting 42 percent deformation at 500 pounds pressure, however, when combined with vulcanizing agents the methyl sulfate pellet suffered deformation of only 6.6 percent at 1500 pounds and retained its original shape with no sign of failure. It should be noted that deformation data given in Table 4 for the vulcanized but unquaternized grains are not comparable to similar data for quaternized pellets. This arises from the fact that the quaternized pellets suffer a more or less permanent set on compression while the vulcanized-unquaternized grains undergo considerable elastic recovery following compression but preceding the measurement of deformation. Presumably, grains of this type can be made more rubbery or less rubbery by decreasing or increasing the amount of quaternizing agent used in conjunction with the vulcanizing compounds.

The results of these tests are set forth in Table 4.

TABLE 4

DEFORMATION TESTS ON 80/20 POTASSIUM CHLORIDE/BINDER GRAINS
[Binder: 75/25 butadiene/2-methyl-5-vinylpyridine]

| Quaternizing agent | Percent deformation | | Condition of pellet at 1,500 p.s.i. |
|---|---|---|---|
| | Total at 1,000 p.s.i. | From 1,000 to 1,500 p.s.i. | |
| Methyl sulfate | 2.18 | 4.44 | Unchanged. |
| Benzotrichloride | 4.00 | 3.12 | Do. |
| Chloropicrin | 6.45 | 0.0 | Do. |
| Benzoyl chloride | 12.0 | 5.68 | Sides bowed. |
| None | 14.4 | 7.37 | Sides cracked and bowed. |

EXAMPLE VI

The following materials which have been prepared, are illustrative of other copolymers which may be employed in the practice of our invention and which, after quaternization, are suitable as an ingredient of our rocket propellant compositions:

Two solid, rubber-like copolymers of 1,3-butadiene were prepared, one using 2-vinylpyridine as one comonomer and the other using 2-methyl-5-vinylpyridine. Polymerization was effected at 50° C. using the following recipe and under the following conditions:

Recipe A

| Ingredient: | Parts by weight |
|---|---|
| 1,3-butadiene | 95 |
| 2-vinylpyridine or 2-methyl-5-vinylpyridine | 5 |
| Water | 180 |
| Soap flakes (sodium fatty acid soap) | 5 |
| A blend of mercaptans [1] | 0.4 or 0.45 |
| Potassium persulfate | 0.3 |

[1] A blend of tertiary $C_{12}$, $C_{14}$ and $C_{16}$ aliphatic mercaptans in a ratio of 3:1:1 parts by wt.

Time-conversion data

| Copolymer | Mercaptan blend | Time, hrs. | Conversion, percent |
|---|---|---|---|
| 1,3-butadiene/2-vinylpyridine | 0.4 | 8 | 83.2 |
| 1,3-butadiene/2-methyl-5-vinylpyridine | 0.45 | 22 | 73 |

Also two solid 1,3-butadiene-acrylonitrile/2-methyl-5-vinylpyridine polymers were prepared from the corresponding monomers, respectively, in weight ratios of 85/15/5 and 85/15/10 in accordance wtih the following recipe:

Recipe B

| Ingredients: | Parts by weight |
|---|---|
| Total monomers | 100 |
| Water | 5 |
| Soap flankes (sodium fatty acid soap) | 180 |
| A blend of mercaptans [1] | 0.4 |
| Potassium persulfate | 0.3 |

[1] A blend of tertiary $C_{12}$, $C_{14}$ and $C_{16}$ aliphatic mercaptans in a ratio of 3:1:1 parts by weight.

Polymerization was effected at 40° C. The time-conversion data are shown below:

| Monomers | | | Time, hrs. | Conversion, percent |
|---|---|---|---|---|
| 1,3-butadiene | acrylonitrile | 2-methyl-5-vinylpyridine | | |
| 85 | 15 | 5 | 10 | 75 |
| 85 | 15 | 10 | 12.5 | 73 |

Also the basic recipe given in recipe B above was employed for the preparation of an 85/10/5 1,3-butadiene/acrylonitrile/2-methyl-5-vinylpyridine solid polymer at 40° C. except that 0.3 part mercaptan blend was used instead of 0.4 part. Additionally, employing the basic recipe given in recipe B above, four 1,3-butadiene/2-methyl-5-vinylpyridine polymers were prepared except that the amount of mercaptan blend was varied. Polymerization was effected at 50° C. The time-conversion data and properties for each of these polymers are shown below:

| Monomer ratio | Mercaptan blend | Time, hrs. | Conversion, percent | ML-4 Mooney value |
|---|---|---|---|---|
| 50/50 | 0.45 | 7.5 | 72.5 | 15 |
| 50/50 | 0.60 | 6 | 64.0 | ([1]) |
| 75/25 | 0.45 | 8.5 | 71.5 | 19 |
| 90/10 | 0.45 | 11 | 75.8 | 51 |

[1] Too soft to measure.

Still employing the basic recipe given in recipe B above, another polymer was prepared, employing a monomer ratio of 75/25 1,3-butadiene/2-methyl-5-vinylpyridine except that 0.5 part mercaptan blend was used instead of 0.4 part. Polymerization was effected at 50° C. and the conversion was 77 percent.

As will be obvious to those skilled in the art various modifications, changes and substitutions will suggest themselves and which do not depart from the spirit or scope of this invention.

We claim:
1. A solid propellant consisting essentially of an intimate admixture of a major amount by wt. of a solid inorganic oxidizing salt and a minor amount by wt. of a solid 1,3-butadiene-N-aryl vinyl substituted pyridine halide polymer.
2. A solid propellant consisting essentially of an intimate admixture of a major amount by wt. of ammonium nitrate and a minor amount by wt. of a solid 1,3-butadiene-N-alkyl vinyl substituted pyridine halide polymer.
3. A solid propellant consisting essentially of an intimate admixture of 50–90 parts by wt. of a solid inorganic oxidizing salt and 50–10 parts by wt. of a solid 1,3-butadiene-N-alkyl vinyl substituted pyridine halide polymer.
4. A solid propellant consisting essential of an intimate admixture of from 50 to 90 percent by wt. of a solid inorganic oxidizing salt and from 50 to 10 percent by wt. of a solid 1,3-butadiene-N-alkyl vinylpyridine halide polymer.
5. A solid propellant composition consisting essentially of an intimate admixture of a major amount of a solid inorganic oxidizing salt and a minor amount of a solid quaternized copolymer of (1) a conjugated diene having up to 8 carbon atoms per molecule, and (2) at least one

substituted heterocyclic nitrogen base selected from the group consisting of pyridine, quinoline, alkyl substituted pyridine and alkyl substituted quinoline, wherein the total number of carbon atoms in the nuclear alkyl substituent is not more than 12 and R is selected from the group consisting of hydrogen and an alkyl radical and where said

group is attached to a nuclear carbon atom.
6. The solid propellant composition according to claim 5 wherein said copolymer is quaternized with an alkyl halide.
7. The solid propellant composition according to claim 5 wherein said copolymer is quaternized with an alkylene halide.
8. The solid propellant composition according to claim 5 wherein said copolymer is quaternized with an aromatic compound containing at least one substituent selected from the group consisting of halogen, sulfonate, and nitro groups.
9. The solid propellant composition according to claim 5 wherein said copolymer is quaternized with a halogen substituted alkane.
10. The solid propellant composition according to claim 5 wherein said copolymer is quaternized with a polyhalogenated cycloalkene.
11. The solid propellant composition according to claim 5 wherein said copolymer is quaternized with a hexachlorocyclopentadiene.
12. The solid propellant composition according to claim 5 wherein said copolymer is quaternized with an alkyl sulfate.
13. A propellant composition consisting essentially of an intimate admixture of a major amount of ammonium nitrate and a minor amount of a quaternized copolymer of (1) from 25 to 98 percent by weight of 1,3-butadiene, based on the total monomeric material, and (2) between 75 and 2 percent by weight of 2-methyl-5-vinylpridine, based on the total monomeric material.
14. A propellant composition consisting essentially of an intimate admixture of a major amount of ammonium nitrate and a minor amount of a quaternized copolymer of (1) from 25 to 98 percent by weight of 1,3-butadiene, based on the total monomeric material, and (2) between 75 and 2 percent by weight of 2-vinylpyridine, based on the total monomeric material.
15. A propellant composition consisting essentially of an intimate admixture of a major amount of ammonium nitrate and a minor amount of a quaternized copolymer of (1) from 25 to 98 percent by weight of 1,3-butadiene, based on the total monomeric material, (2) between 75 and 2 percent by weight of 2-methyl-5-vinylpyridine, based on the total monomeric material, and (3) from 5 to 50 percent by weight of acrylonitrile, based on the total monomeric material.
16. A solid propellant composition consisting essentially of an intimate admixture of a major amount of a solid inorganic oxidizing salt and a minor amount of a solid vulcanized quaternized copolymer, said copolymer being a liquid copolymer of (1) a conjugated diene having up to 8 carbon atoms per molecule, and (2) at least one

substituted heterocyclic nitrogen base selected from the group consisting of pyridine, quinoline, alkyl substituted pyridine and alkyl substituted quinoline, wherein the total number of carbon atoms in the nuclear alkyl substituents is not more than 12 and wherein R is selected from the group consisting of hydrogen and an alkyl radical and where said

group is attached to a nuclear carbon atom.
17. A solid propellant composition consisting essentially of an intimate admixture of a major amount of a solid inorganic oxidizing salt and minor amount of a solid quaternary ammonium compound of a copolymer of (1) a conjugated diene having up to 8 carbon atoms per molecule, and (2) at least one

substituted heterocyclic nitrogen base selected from the group consisting of pyridine, quinoline, alkyl substituted pyridine and alkyl substituted quinoline, wherein the total number of carbon atoms in the nuclear alkyl substituents is not more than 12 and wherein R is selected from the group consisting of hydrogen and an alkyl radical and where said

group is attached to a nuclear carbon atom.
18. A solid propellant composition consisting essentially of an intimate admixture of from 50 to 90 percent by weight of a solid inorganic oxidizing salt and from 50 to 10 percent by weight of a solid quaternary ammonium compound of a liquid copolymer of (1) a conjugated diolefin having up to 8 carbon atoms per molecule, and (2) at least one

substituted heterocyclic nitrogen base selected from the group consisting of pyridine, quinoline, alkyl substituted pyridine and alkyl substituted quinoline, wherein the total number of carbon atoms in the nuclear alkyl substituents is not more than 12 and wherein R is selected from the group consisting of hydrogen and an alkyl radical and where said

group is attached to a nuclear carbon atom.

19. A propellant composition consisting essentially of an intimate admixture of a major amount of an inorganic oxidizing salt and a minor amount of a solid conjugated diolefin-N-alkyl vinylpyridine halide polymer.

20. A propellant composition consisting essentially of an intimate admixture of a major amount of an inorganic oxidizing salt and a minor amount of a conjugated diolefin-N-alkyl vinylquinoline halide polymer.

21. A propellant composition consisting essentially of an intimate admixture of a major amount of an inorganic oxidizing salt and a minor amount of 1,3-butadiene-N-alkyl vinylpyridine halide polymer.

22. A propellant composition consisting essentially of an intimate admixture of a major amount of an inorganic oxidizing salt and a minor amount of a 1,3-butadiene-N-alkyl vinylquinoline halide polymer.

23. A method of preparing a propellant composition which comprises forming an intimate admixture of a major amount of an inorganic oxidizing salt, a minor amount of a copolymer of from 25 to 98 percent by weight of 1,3-butadiene, based on the total monomeric material, and between 75 and 2 percent by weight of a vinylquinoline, based on the total monomeric material and an alkyl halide, and reacting the resulting admixture to form a solid material.

24. A method of preparing a propellant composition which comprises forming an intimate admixture of a major amount of an inorganic oxidizing salt, a minor amount of a copolymer of from 25 to 98 percent by weight of 1,3-butadiene, based on the total monomeric material and between 75 and 2 percent by weight of a vinylpyridine, based on the total monomeric material and an alkyl halide, and reacting the resulting admixture to form a solid material.

25. A method of preparing a propellant composition which comprises forming an intimate admixture of a major amount of ammonium nitrate, a minor amount of a copolymer of from 25 to 98 percent by weight of liquid 1,3-butadiene, based on the total monomeric material and between 75 and 2 percent by weight of a vinylpyridine, based on the total monomeric material and an alkyl halide, and reacting the resulting admixture to form a solid material.

26. A method of preparing a propellant composition which comprises forming an intimate admixture of a major amount of an inorganic oxidizing salt, and a minor amount of the copolymer of (1) a conjugated diene having up to 8 carbon atoms per molecule, (2) at least one

substituted heterocyclic nitrogen base selected from the group consisting of pyridine, quinoline, alkyl substituted pyridine and alkyl substituted quinoline, wherein the total number of carbon atoms in the nuclear alkyl substituent is not more than 12 and wherein R is selected from the group consisting of hydrogen and an alkyl radical and where said

group is attached to a nuclear carbon atom, and a quaternizing agent other than an acid, and heating the resulting admixture to yield a substantially solid material.

References Cited in the file of this patent

UNITED STATES PATENTS

| | | |
|---|---|---|
| 2,402,020 | Cislak et al. | June 11, 1946 |
| 2,484,420 | Minsk et al. | Oct. 11, 1949 |
| 2,484,430 | Sprague et al. | Oct. 11, 1949 |
| 2,487,829 | Richards | Nov. 15, 1949 |
| 2,540,985 | Jackson | Feb. 6, 1951 |

OTHER REFERENCES

Hackh's Chemical Dictionary, 3rd edition (1944). The Blakison Co., Philadelphia. Page 895.